United States Patent [19]

Harms et al.

[11] Patent Number: 4,461,488
[45] Date of Patent: Jul. 24, 1984

[54] SEAL FOR LINK OF TRACK CHAIN

[75] Inventors: Hans W. Harms, Wuppertal; Ditmar Reimann, Willich, both of Fed. Rep. of Germany

[73] Assignee: Intertractor Viehmann GmbH & Co., Gevelsberg, Fed. Rep. of Germany

[21] Appl. No.: 507,839

[22] Filed: Jun. 24, 1983

[30] Foreign Application Priority Data

Jan. 7, 1983 [DE] Fed. Rep. of Germany ....... 3300288

[51] Int. Cl.³ .............................................. F16J 15/38
[52] U.S. Cl. ........................................ 277/92; 277/95; 277/178; 277/206 R; 305/11
[58] Field of Search .................. 277/63, 81 R, 84, 92, 277/95, 176, 178, 153, 205, 206 R; 305/11-13

[56] References Cited

U.S. PATENT DOCUMENTS

| | | | |
|---|---|---|---|
| 2,368,611 | 1/1945 | Charnock | 305/11 X |
| 2,470,925 | 5/1949 | Fredrickson | 277/178 |
| 2,877,029 | 3/1959 | Peguet et al. | 277/84 X |
| 2,888,281 | 5/1959 | Ratti | 277/81 R X |
| 3,563,557 | 2/1971 | Doutt | 277/178 |
| 4,030,730 | 6/1977 | Maguire | 277/92 |
| 4,179,130 | 12/1979 | Fass et al. | 277/92 X |
| 4,204,716 | 5/1980 | Baylor | 305/11 |

FOREIGN PATENT DOCUMENTS 1183249  2/1959  France ................................ 277/178

Primary Examiner—Robert S. Ward
Attorney, Agent, or Firm—Karl F. Ross; Herbert Dubno

[57] ABSTRACT

A chain-track link assembly has a pin extending along and defining an axis, an outer link element fixed to the pin and forming therewith an axially open annular recess having an annular end face lying substantially in a plane perpendicular to the axis and a radially inwardly directed cylindrical inner surface centered on the axis, an inner link element pivotal about the axis on the pin and having an annular end face substantially parallel to and axially confronting the end face of the outer link element, and an annular seal in the recess between the end faces, centered on the axis and substantially axially symmetrical therearound. The seal has a hard and radially outwardly U-section part formed with a pair of like legs having axially oppositely directed sides each formed by a pair of opposite inclined and axially oppositely tapered surfaces joining substantially at a line. This part bears axially against the end faces at the respective lines and also has a base axially bridging the legs and joined thereto at annular regions of a thickness smaller than the thickness of the legs radially outward therefrom. A relatively springy elastomeric seal part compressed axially between the legs of the outer part is itself formed with a pair of axially oppositely directed sides engaging the respective legs of the hard seal part and themselves formed with respective annular grooves open axially away from each other. This springy seal part has an outer surface that is substantially smooth and ungrooved in axially uncompressed condition of the spring seal part and radially outwardly grooved and forming a pair of ridges engaging the inner surface of the recess when axially compressed in the U-section part between the end faces.

11 Claims, 3 Drawing Figures

SEAL FOR LINK OF TRACK CHAIN

FIELD OF THE INVENTION

The present invention relates to a link of the chain of a tracklaying vehicle. More particularly this invention concerns the seal provided between the links.

BACKGROUND OF THE INVENTION

A standard track chain, such as described in U.S. Pat. No. 4,179,130, is formed of a succession of links each consisting of a pair of parallel link elements extending along the track displacement direction, a pin extending perpendicular to this direction from one end of one of the link elements to the corresponding one end of the other link element, and a sleeve or tube extending between the other ends of the link elements parallel to the pin. The one ends interconnected by the pin are further apart than the other ends interconnected by the sleeve, and each pin passes through the sleeve of the leading or trailing link. Thus the links are journaled together by the pins fitting in the sleeves at a joint capable of transmitting considerable force while relatively inexpensive to mass produce.

Obviously it is essential to keep the space between each sleeve and the pin it receives perfectly clean and well lubricated, to minimize wear at this sliding-surface joint. Accordingly a seal is provided that is compressed axially between each end face of the sleeve and a confronting end face of the respective one link end. This seal must keep the lubricant in while keeping liquids and grit out, a particularly difficult task due to the inevitable use of the track chain in wet and dirty conditions.

The seal is formed of a deformable but relatively wear-resistant U-section outer part and an elastomeric and very springy inner part within the outer part and biasing same into axial contact with both the end faces. To this end the axially oppositely directed sides of the seal are formed with outwardly directed ridges or lips to provide line contact between the seal and the surfaces engaged by it. The inner part according to the above-mentioned patent is formed of steel and of U-section like the outer part, but is fitted into it so the it opens at the base of the outer part. The legs of the inner and outer parts therefore bear axially on each other.

A problem with such a seal is that it can get canted in the recess, lifting partially from one or the other end surfaces. This allows leakage into and out of the link assembly. In addition the somewhat exposed steel inner part of the seal is relatively corrosible, so it must be replaced often, in particular when used around salt water. Since the seal is a fairly expensive item, such replacement can be quite costly.

OBJECTS OF THE INVENTION

It is therefore an object of the present invention to provide an improved link assembly for a track chain.

Another object is the provision of such a link assembly for a track chain which overcomes the above-given disadvantages, that is which provides a very good seal under all circumstances, which has a long service life, and which is inexpensive to manufacture.

A further object is to provide a seal which can be serviced right in the field if necessary.

SUMMARY OF THE INVENTION

A chain-track link assembly according to the invention has a pin extending along and defining an axis, an outer link element fixed to the pin and forming therewith an axially open annular recess having an annular end face lying substantially in a plane perpendicular to the axis and a radially inwardly directed cylindrical inner surface centered on the axis, an inner link element pivotal about the axis on the pin and having an annular end face substantially parallel to and axially confronting the end face of the outer link element, and an annular seal in the recess between the end faces, centered on the axis and substantially axially symmetrical therearound. The seal has a relatively hard, resiliently deformable, and radially outwardly U-section part formed with a pair of like legs having axially oppositely directed sides each formed by a pair of opposite inclined and axially oppositely tapered surfaces joining substantially at a line. This part bears axially against the end faces at the respective lines and also has a base axially bridging the legs and joined thereto at annular regions of a thickness smaller than the thickness of the legs radially outward therefrom. A relatively springy elastomeric seal part compressed axially between the legs of the outer part is itself formed with a pair of axially oppositely directed sides engaging the respective legs of the hard seal part and themselves formed with respective annular grooves open axially away from each other. Thus the legs do not engage the soft seal part at the grooves. In addition this springy seal part has an outer surface that is substantially smooth and ungrooved in axially uncompressed condition of the spring seal part and radially outwardly grooved and forming a pair of ridges engaging the inner surface of the recess when axially compressed in the U-section part between the end faces.

Such a seal is capable of considerable axial expansion and contraction, so that even if the link elements get twisted relative to each other, the joint does not open up. At the same time the ridges bearing resiliently outward on the inner surface of the recess inhibit any canting of the seal in the joint, ensuring that it remains perfectly centered for best possible sealing effect.

According to another feature of this invention each groove has a radially inner flank forming an acute angle and merging gently with the respective end face and a radially outer flank meeting the respective end face generally at a right angle. In addition in axially uncompressed condition the spring seal part is axially longer at its radial outer periphery than at its radially inner periphery. Furthermore the springy seal part fits snugly to the U-section part between the ridge of the base and the legs, and is in fact bonded to the U-section part between the ridge of the base and the legs.

The base of the U-section part according to the invention is formed with an axially outwardly projecting unitary ridge and the springy seal part is formed with a radially inwardly open groove complementary to and snugly receiving the ridge of the base. The seal is symmetrical abut a plane passing through the ridge of the base.

The inner link element includes a sleeve coaxially surrounding the rod and forming the end face and a spacer tube coaxially surrounding the rod between the end faces and holding same axially apart by a distance equal to the axial tube length. The seal spacedly surrounds the spacer tube to leave a further space that can be filled with lubricant.

The U-section part in accordance with this invention is made of a wear-resistant synthetic resin such as Teflon (polytetrafluoroethylene) and the springy seal part is made of a natural or synthetic rubber.

DESCRIPTION OF THE DRAWING

The above and other features and advantages will become more readily apparent from the following, reference being made to the accompanying drawing in which.

SPECIFIC DESCRIPTION

Figure 1:
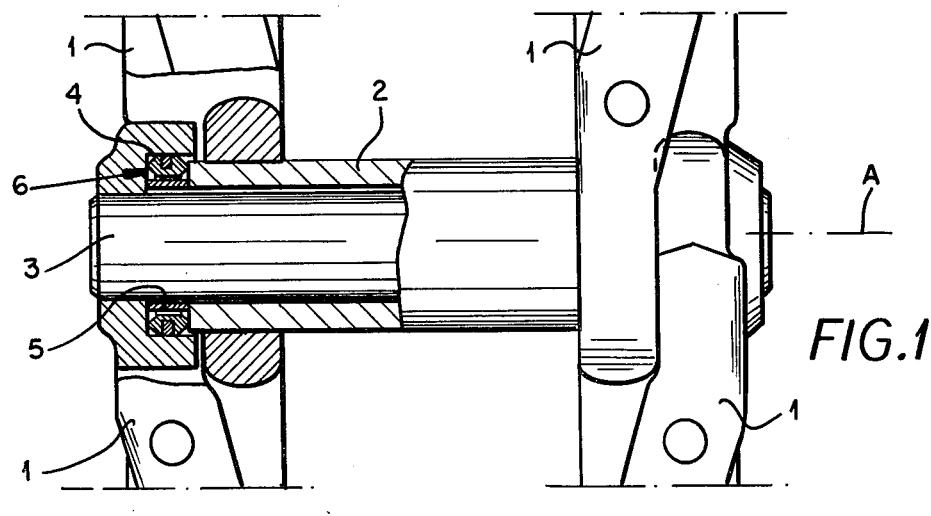
FIG. 1 is a partly sectional view of the assembly of the instant invention.

As seen in FIG. 1 succeeding link elements 1 of a caterpillar chain of a tracklaying vehicle are interconnected by a spacer sleeve 2 force fitted in the end of a respective link element 1 and a pin 3 passing coaxially to axis A through the tube 2 and force-fitted in the corresponding end of the adjacent link element 1. As is known each pair of link elements 1 forms a respective link to which a tread plate is bolted. The succeeding links pivot together at the axes A, with each pin 3 journaled in the sleeve 2 of the leading or trailing link.

The outer link element 1, that is the element 1 receiving the pin 3, is formed therearound with a cylindrical axially open recess 4 centered on the axis A. A spacer ring 5 extends axially across this recess 4 and axially abuts the outer link 1. A two-part seal 6 is provided engaging axially between the outer end face 23 of the sleeve 2 and the confronting face 24 of the recess 24, and also engages radially outward against the radially inwardly directed cylindrical surface 25 of the recess 4.

Figure 2:
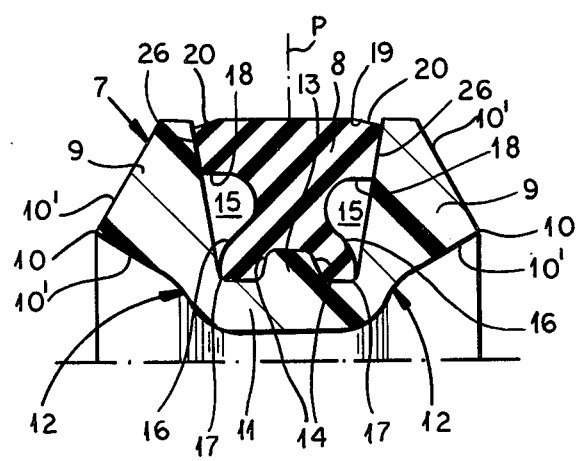
FIG. 2 is a large-scale view of the seal according to this invention in unmounted condition.
Figure 3:
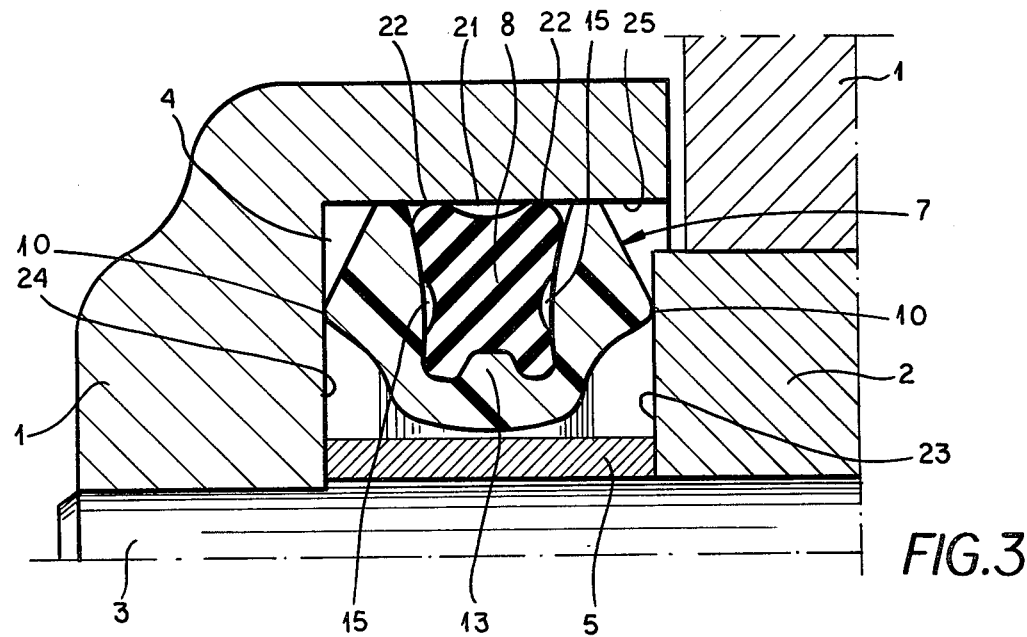
FIG. 3 is a large-scale view of a detail of FIG. 1.

This seal 6 as better shown in FIGS. 2 and 3 comprises a U-section outer part 7 of a wear-resistant synthetic resin such as polytetrafluorethylene and a soft elastomeric inner part 8.

The outer part 7 has a pair of substantially identical legs or flanges 9 each formed with a pair of axially outwardly directed and converging outer flanks 10′ meeting at respective lines 10 where they contact the surfaces 23 and 24. This part 7 is formed with reduced wall thickness at regions 12 where its legs 9 join the base or floor 11 interconnecting them. Thus the flange legs 9 can hinge readily inward at these reduced-thickness regions 12 where each leg 9 joins the base 11, which is advantageous for reasons detailed below. In addition the radially outwardly directed face of the annular base 11 of the radially outwardly open U-section part 7 is centrally formed with a radially outwardly projecting rib or ridge 13 that lies in and is bisected by a plane P that is perpendicular to the axis A and the symmetry plane for the seal 6.

The inner part 8 is generally of pi-section when unstressed as shown in FIG. 2 and of x-section when axially compressed as shown in FIG. 3. This compression is created by the above-mentioned hinging-in of the flanges 9 when the seal 6 is axially compressed between the surfaces 23 and 24. The part further is formed with a radially inwardly open groove 14 complementary to the ridge 13 and snugly receiving same. Each axially directed side of the part 8 is formed with an axially open annular groove 14 inclined at an acute angle in an inner region 16 and at a much more perpendicular angle at an outer region or flank 18. The more gently sloped inner flank or region 16 meets a rounded inner edge 17 of the part 8. The part 8 further has a normally cylindrical radially outwardly directed outer surface 19 joined at chamfers 20 to the outer portions 26 of its axially directed sides.

As a result of this formation of the part 8, when it is compressed mainly axially as shown in FIG. 3 it deforms to x-section, engaging the radially inwardly directed surface 25 of the recess 4 at two annular ridges or lines 22 forming an outwardly open groove 21. Such deformation will not, however, significantly increase the radial dimension of the seal 6, so that it will not engage radially inward against the ring 5.

The seal 6 will therefore contact the outer link part 1 along one line or edge 10 with the rigid outer part 7 and along two lines or edges 22 with the soft inner part 8. It will contact the inner link part, here the end of the tube 2 along only a single line or edge 10. Most relative motion will therefore be between the face 23 and the respective edge 10. If the edge 10 in contact with the face 23 wears too much, the entire seal 6 can be taken out, reversed, and replaced to bring a fresh and sharper edge 10 into contact with the face 23.

Due to the considerable axial compressibility of this arrangement the two elements 1 can be come somewhat canted to each other without the seal opening. Furthermore since both parts 7 and 8 engage radially outward against the inner surface 25 of the recess 4, the seal 6 remains perfectly centered, spaced out from the spacer tube 5 so that the entire area inside this seal is available to be filled with lubricant.

We claim:

1. In a chain-track link assembly having:
    a pin extending along and defining an axis;
    an outer link element fixed to the pin and forming therewith an axially open annular recess having an annular end face lying substantially in a plane perpendicular to the axis and a radially inwardly directed cylindrical inner surface centered on the axis; and
    an inner link element pivotal about the axis on the pin and having an annular end face substantially parallel to and axially confronting the end face of the outer link element; an annular seal in the recess between the end faces, centered on the axis and substantially axially symmetrical therearound, and comprising:
    a relatively hard, resiliently deformable, and radially outwardly U-section part formed with
    a pair of like legs having axially oppositely directed sides each formed by a pair of opposite inclined and axially oppositely tapered surfaces joining substantially at a line, the U-section part bearing axially against the end faces at the respective lines; and
    a base axially bridging the legs and joined thereto at annular regions of a thickness smaller than the thickness of the legs radially outward therefrom; and
    a relatively springy elastomeric seal part compressed axially between the legs of the outer part and formed with
    a pair of axially oppositely directed sides engaging the respective legs of the hard seal part and formed with respective annular grooves open axially away from each other, whereby the legs do not engage the soft seal part at the grooves;
    an outer surface that is substantially smooth and ungrooved in axially uncompressed condition of the spring seal part and radially outwardly grooved and forming a pair of ridges engaging the inner surface of the recess when axially compressed in the U-section part between the end faces.

2. The chain-track link assembly defined in claim 1 wherein each groove has a radially inner flank forming an acute angle and merging gently with the respective end face and a radially outer flank meeting the respective end face generally at a right angle.

3. The chain-track link assembly defined in claim 1 wherein in axially uncompressed condition the spring seal part is axially longer at its radial outer periphery than at its radially inner periphery.

4. The chain-track link assembly defined in claim 1 wherein the base of the U-section part is formed with an axially outwardly projecting unitary ridge and the springy seal part is formed with a radially inwardly open groove complementary to and snugly receiving the ridge of the base.

5. The chain-track link assembly defined in claim 4 wherein the springy seal part fits snugly to the U-section part between the ridge of the base and the legs.

6. The chain-track link assembly defined in claim 5 wherein the springy seal is bonded to the U-section part between the ridge of the base and the legs.

7. The chain-track link assembly defined in claim 4 wherein the seal is symmetrical about a plane passing through the ridge of the base.

8. The chain-track link assembly defined in claim 1 wherein the inner link element includes:
- a sleeve coaxially surrounding the rod and forming the end face; and
- a spacer tube coaxially surrounding the rod between the end faces and holding same axially apart by a distance equal to the axial tube length.

9. The chain-track link assembly defined in claim 8 wherein the seal spacedly surrounds the spacer tube.

10. The chain-track link assembly defined in claim 1 wherein the U-section part is made of a wear-resistant synthetic resin.

11. The chain-track link assembly defined in claim 1 wherein the springy seal part is made of a rubber.

* * * * *